United States Patent
Ito

(10) Patent No.: US 10,762,616 B2
(45) Date of Patent: Sep. 1, 2020

(54) METHOD AND SYSTEM OF ANALYTICS SYSTEM BALANCING LEAD TIME AND ACCURACY OF EDGE ANALYTICS MODULES

(71) Applicant: Hitachi, Ltd., Chiyoda-ku, Tokyo (JP)

(72) Inventor: Daisuke Ito, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 224 days.

(21) Appl. No.: 16/030,620

(22) Filed: Jul. 9, 2018

(65) Prior Publication Data

US 2020/0013159 A1 Jan. 9, 2020

(51) Int. Cl.
| | |
|---|---|
| G06K 9/00 | (2006.01) |
| G06T 7/00 | (2017.01) |
| G06N 3/04 | (2006.01) |
| G06N 3/08 | (2006.01) |
| H04L 29/08 | (2006.01) |
| H04N 5/232 | (2006.01) |

(52) U.S. Cl.
CPC ......... *G06T 7/0004* (2013.01); *G06N 3/0454* (2013.01); *G06N 3/08* (2013.01); *G06T 2207/10016* (2013.01); *G06T 2207/20081* (2013.01); *G06T 2207/20084* (2013.01); *G06T 2207/30108* (2013.01); *H04L 67/12* (2013.01); *H04N 5/23206* (2013.01)

(58) Field of Classification Search
CPC ......... G06T 7/0004; G06T 2207/10016; G06T 2207/30108; G06T 2207/20084; G06N 3/08; G06N 3/0454; H04N 5/23206; H04L 67/12; H04L 67/34
See application file for complete search history.

(56) References Cited

U.S. PATENT DOCUMENTS

| | | | | |
|---|---|---|---|---|
| 10,460,255 B2 * | 10/2019 | Nagaraju | ............ | G06F 11/3409 |
| 2016/0063393 A1 * | 3/2016 | Ramage | ................. | H04L 67/42 |
| | | | | 706/12 |
| 2016/0261481 A1 * | 9/2016 | Ogata | ...................... | H04L 43/10 |
| 2017/0005736 A1 * | 1/2017 | Gage | ......................... | H04L 1/20 |
| 2017/0060574 A1 | 3/2017 | Malladi et al. | | |
| 2017/0109322 A1 * | 4/2017 | McMahan | ............. | G06N 20/00 |
| 2017/0195424 A1 * | 7/2017 | Nasir | ...................... | H04L 67/36 |
| 2018/0032908 A1 * | 2/2018 | Nagaraju | ................ | G06F 11/30 |
| 2018/0032915 A1 * | 2/2018 | Nagaraju | ................ | G06N 3/08 |
| 2018/0240011 A1 * | 8/2018 | Tan | ......................... | G06F 9/46 |
| 2018/0375720 A1 * | 12/2018 | Yang | ....................... | H04L 69/40 |
| 2019/0227980 A1 * | 7/2019 | McMahan | ............ | G06N 3/0454 |
| 2019/0318268 A1 * | 10/2019 | Wang | ..................... | G06N 20/00 |
| 2020/0012881 A1 * | 1/2020 | Justice | ............... | G06K 9/00986 |
| 2020/0012966 A1 * | 1/2020 | Nagaraju | ............ | G06F 11/3409 |
| 2020/0013159 A1 * | 1/2020 | Ito | ............................ | G06N 3/08 |
| 2020/0014591 A1 * | 1/2020 | Ito | ....................... | H04L 41/0813 |
| 2020/0112490 A1 * | 4/2020 | Mopur | ................... | G06N 20/00 |

\* cited by examiner

*Primary Examiner* — Aaron W Carter
(74) *Attorney, Agent, or Firm* — Procopio, Cory, Hargreaves & Savitch LLP

(57) ABSTRACT

Systems and methods described herein are directed to changing models and analytics algorithms on an edge node from a core server, which can be useful in situations such as optimized factories when the edge node is physically close to data sources such as within a factory plant. The core server or cloud runs analytics algorithms and models concurrently with data received from edge nodes, and replaces the edge node with more accurate analytics algorithms and models as applicable.

15 Claims, 7 Drawing Sheets

METHOD AND SYSTEM OF ANALYTICS SYSTEM BALANCING LEAD TIME AND ACCURACY OF EDGE ANALYTICS MODULES

BACKGROUND

Field

The present invention relates generally to edge devices, and more particularly, to automating changing models of analytics on edge devices while they are in operation.

Related Art

In the related art, an optimized factory is an example application of Internet of Things (IoT). In such applications, gathering extra data by using additional sensors has been researched for the purposes of improving or realizing the desired IoT applications. In the related art implementations, video cameras are a commonly applied sensor and utilized to improve some factory applications such as predictive maintenance and worker safety.

To utilize video cameras, video analytics are utilized and executed in an edge area due to network cost limitations. The edge area referred to herein is an area that is physically close to data sources such as video cameras. In an example of the optimized factory, the edge area is the area inside the factory plants.

In an example related art implementation, neural networks can be utilized for video analytics. Such related art implementations can provide high accuracy in many cases after the neural network is trained. However, neural networks require a long time to train, and it can be particularly difficult to train neural networks in the edge area due to computing resource and network limitations. Further, it can be difficult to determine whether the neural network produces suitable results. In other related art implementations, no-lead time type analytics such as template matching can be applied for video analytics, but tends to have limited accuracy in many cases.

In related art implementations, there are systems that facilitate application deployment capability such as dynamic application mobility between the edge and cloud. However, such deployments must be managed manually, which requires a human to be physically present at the edge device.

SUMMARY

There is a need for systems and methods that balance lead time and accuracy of analytics for the edge area.

Aspects of the present disclosure can include an apparatus configured to manage a plurality of edge nodes, which can involve a processor, configured to, for data received from an edge node from the plurality of edge nodes, process the data using a first analytics model that is utilized by the edge node, process the data using a second analytics model, the second analytics model trained through an analytics trainer managed at the apparatus; and for the second analytics model determined to have better accuracy than the first analytics model, update the edge node with the second analytics model.

Aspects of the present disclosure can involve a method for managing a plurality of edge nodes, which can involve for data received from an edge node from the plurality of edge nodes, processing the data using a first analytics model that is utilized by the edge node, processing the data using a second analytics model, the second analytics model trained through an analytics trainer; and for the second analytics model determined to have better accuracy than the first analytics model, updating the edge node with the second analytics model.

Aspects of the present disclosure can involve a non-transitory computer readable medium, storing instructions for managing a plurality of edge nodes, the instructions of which can involve for data received from an edge node from the plurality of edge nodes, processing the data using a first analytics model that is utilized by the edge node, processing the data using a second analytics model, the second analytics model trained through an analytics trainer; and for the second analytics model determined to have better accuracy than the first analytics model, updating the edge node with the second analytics model.

Aspects of the present disclosure can further include a system, which can involve a plurality of edge nodes; and an apparatus, which can involve a processor, configured to, for data received from an edge node from the plurality of edge nodes, process the data using a first analytics model that is utilized by the edge node, process the data using a second analytics model, the second analytics model trained through an analytics trainer managed at the apparatus; and for the second analytics model determined to have better accuracy than the first analytics model, update the edge node with the second analytics model.

Aspects of the present disclosure can further include a system, which can involve a plurality of edge nodes; and an apparatus, which can involve, for data received from an edge node from the plurality of edge nodes, means for processing the data using a first analytics model that is utilized by the edge node, means for processing the data using a second analytics model, the second analytics model trained through an analytics trainer managed at the apparatus; and for the second analytics model determined to have better accuracy than the first analytics model, means for updating the edge node with the second analytics model.

DETAILED DESCRIPTION

Figure 1:
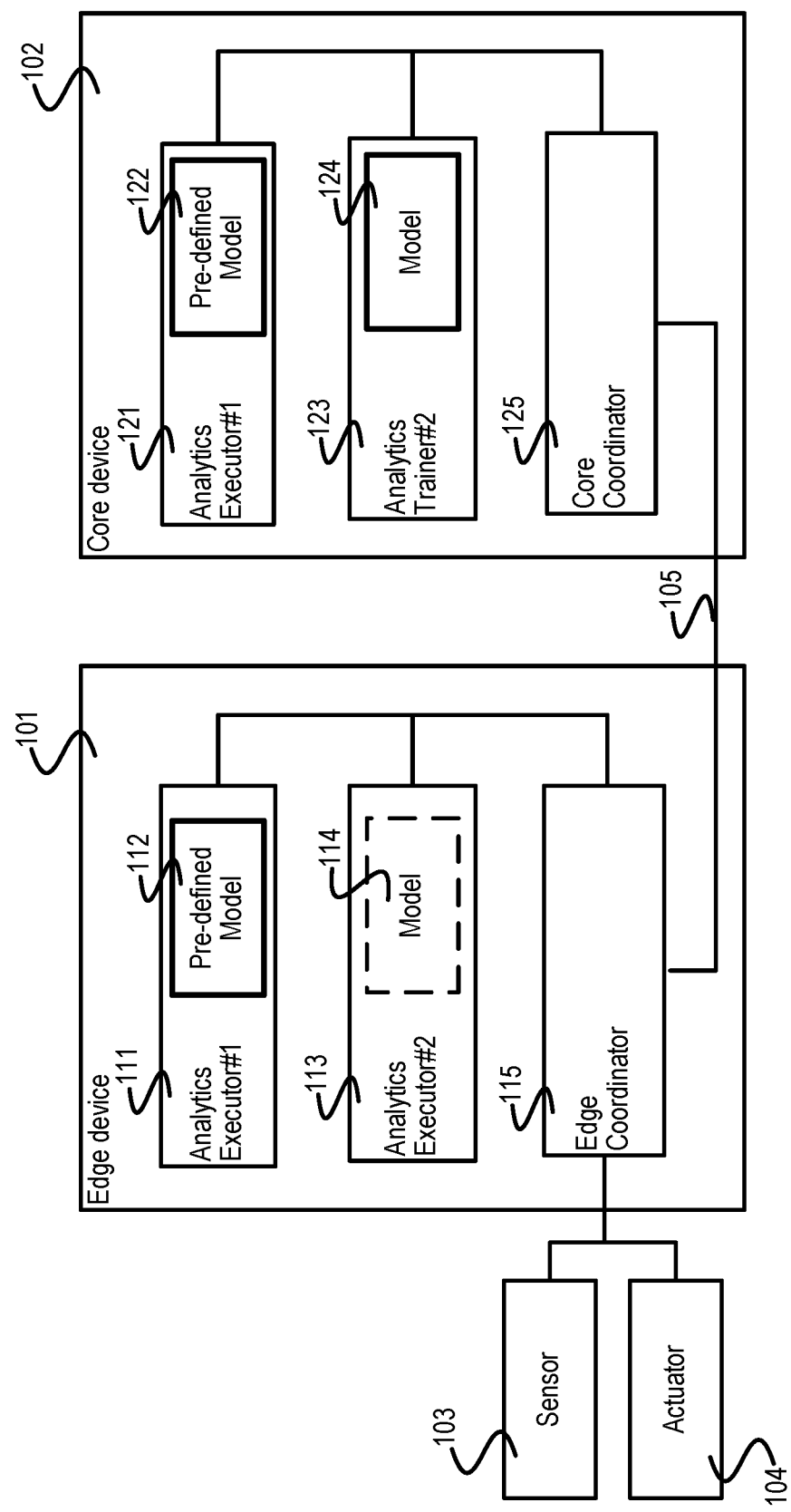
FIG. 1 illustrates an example of the automatic model change system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

First Example Implementation

In a first example implementation, there is an automatic changing method of analytics models for systems that are connected to a network.

FIG. 1 illustrates an example of the automatic model change system, in accordance with an example implementation. In this example, the system involves at least one edge device 101 that is on the edge area where is the area inside a plant, and at least one core device 102 that is on the cloud.

The edge device 101 is connected to one or more sensors 103 and also connected to one or more actuators 104. One of the examples of sensors 103 is a video camera, however other sensors can also be utilized in accordance with the desired implementation. The edge device 101 and the core device 102 are connected by a network 105. The edge device 101 involves an analytics executor #1 111, an analytics executor #2 113 and an edge coordinator 115. The analytics executor #1 111 has a pre-defined model 112 for analytics. The analytics executor #2 113 will generate a model 114 for analytics through automation steps as described herein.

The core devices 102 involves an analytics executor #1 121, an analytics executor #2 123 and a core coordinator 125. The analytics executor #1 121 has a pre-defined model 122 for analytics. The analytics trainer #2 123 manages and trains a model 124 for analytics.

In an example execution for the first example implementation, the analytics executor #1 111 is the same as the analytics executor #1 121, and the pre-defined model 112 is the same as the pre-defined model 122. The analytics executor #2 113 conducts the same analytics as the analytics trainer #2 123. However, the analytics executor #2 113 takes part in the inference phase of the analytics, and the analytics trainer #2 123 takes part in the training phase of the analytics. In the first example implementation, the model 114 generated will be the same as the model 124 from proposed automation steps described herein.

In an example execution for the first example implementation, the analytics executor #1 111, the analytics executor #2 113, the analytics executor #1 121 and the analytics trainer #2 output the accuracy of the analytics, along with the analytics results when new data is received. Analytics trainer #2 123 also outputs the accuracy of the analytics when new data is received.

Figure 2:
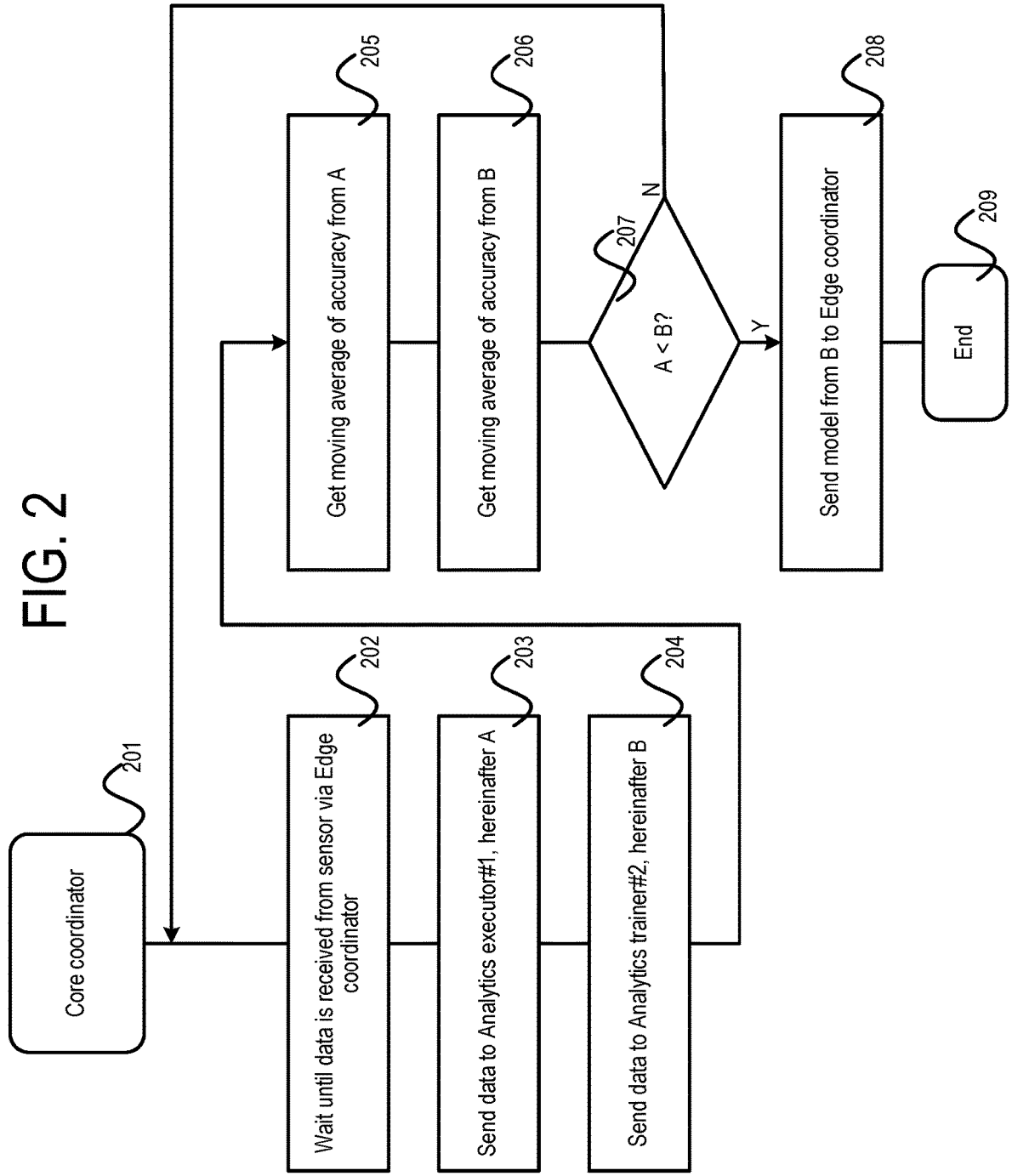
FIG. 2 illustrates an example flow chart of the core coordinator, in accordance with an example implementation.

FIG. 2 illustrates an example flow chart of the core coordinator 125, in accordance with an example implementation. After the core coordinator 125 is initiated at 201, the core coordinator 125 waits until data is received from the sensor 103 via the edge coordinator 115 at 202. In an example implementation, the data received is image data from one or more video cameras; however other sensors can also be utilized in accordance with the desired implementation.

After receiving the data, at 203, the core coordinator 125 sends the received data to the analytics executor #1 121. The analytics executor #1 121 analyzes the received data and outputs both the accuracy of the analytics and the analytics result. At 204, the core coordinator 125 sends the received data from 202 to the analytics trainer #2 123. The analytics trainer #2 123 analyzes the received data from 202 and outputs both the accuracy of analytics and the analytics result.

In example implementations involving the accuracy of analytics for image data, techniques such as class probability can be utilized. In such an example, the class probability indicates a probabilistic value (e.g., between 0 and 1) for each class identified. For example, if an image of a horse is input, an example result of the accuracy of the analytics can involve Horse: 0.85, Donkey: 0.11, Llama: 0.04. Other techniques can also be utilized in accordance with the desired implementation, and the present disclosure is not limited thereto.

At 205, the core coordinator 125 determines a moving average of the accuracy of analytics determined by the analytics executor #1 121. In the example execution for the first example implementation, a subset size is given by operators as a system configuration. The subset size is the same as a subset size of a moving average for the analytics trainer #2 123 at 206. At 206, the core coordinator 125 determines a moving average of the accuracy of analytics determined by the analytics trainer #2 123. In the example execution for the first example implementation, a subset size is given by operators as a system configuration. The subset size is the same as the subset size of the moving average for the analytics executor #1 121 at 205.

At 207, the core coordinator 125 compares the moving average of the accuracy of analytics from the analytics executor #1 121 from 205, and the moving average of the accuracy of analytics from the analytics trainer #2 123 from 206. If the moving average of the accuracy of analytics from the analytics trainer #2 123 from 206 is greater than the moving average of the accuracy of analytics from the analytics executor #1 121 from 205 (Y), the core coordinator 125 sends the model 124 from the analytics trainer #2 123 to the edge coordinator 115 at 208 and the flow ends at 209. Otherwise (N) the flow proceeds back to 202.

Figure 3:
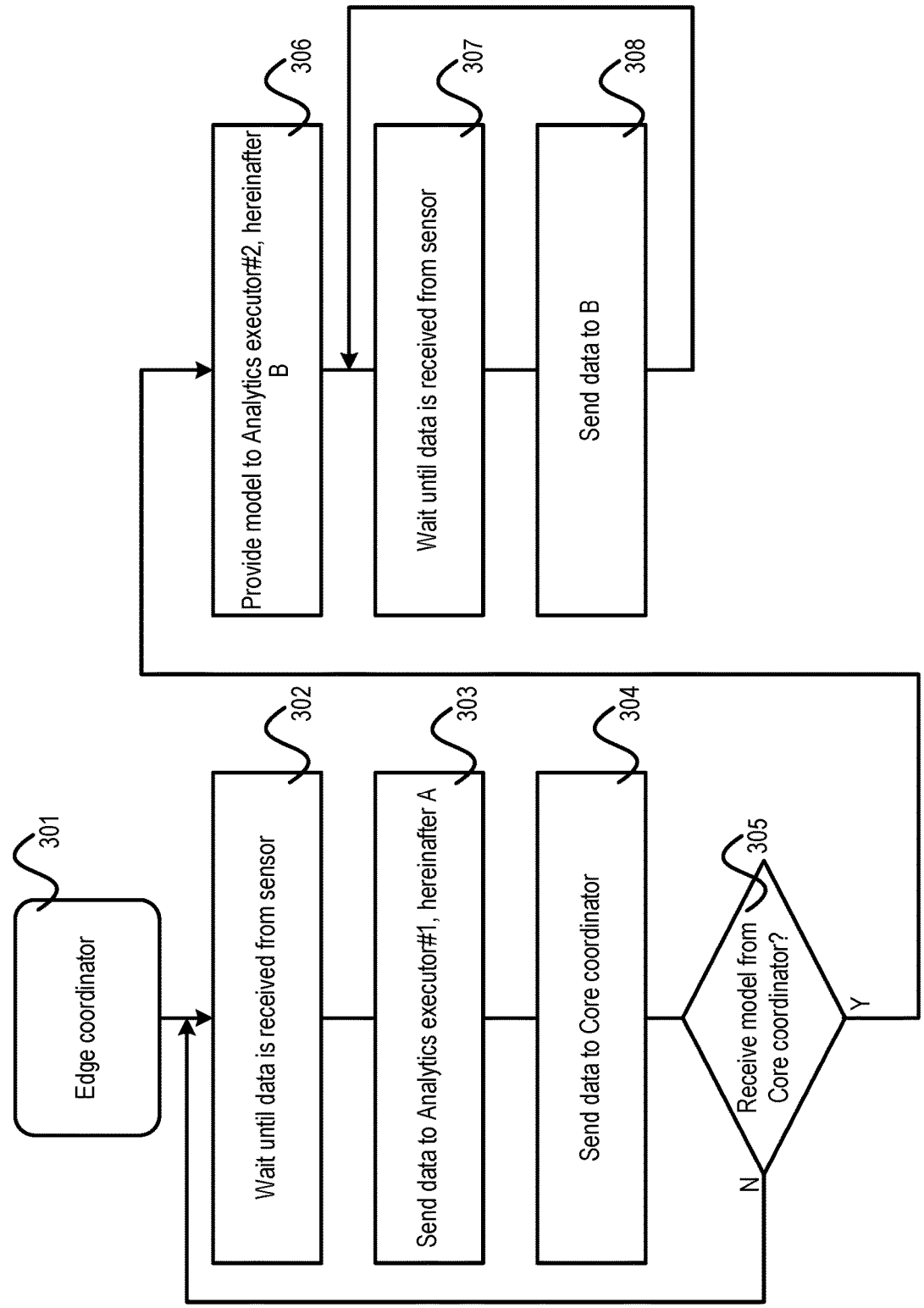
FIG. 3 illustrates a flow chart for the edge coordinator, in accordance with an example implementation.

FIG. 3 illustrates a flow chart for the edge coordinator 115, in accordance with an example implementation. After the edge coordinator 115 has started the flow at 301, the edge coordinator 115 waits until data is received from the sensor 103 at 302.

After receiving the data from the sensor 103, the edge coordinator 115 sends the received data to the analytics executor #1 at 303. At 304, the edge coordinator 115 sends the received data from 302 to the core coordinator 125. At 305, the edge coordinator 115 checks whether a model 124 is received from the core coordinator 125. If so (Y), the flow proceeds to 306 wherein the edge coordinator 115 provides the model 124 to the analytics executor #2 113 as the model #114. Otherwise (N) the flow proceeds back to 302.

At 307, the edge coordinator 115 waits until data is received from the sensor 103. After receiving the data at 308, the edge coordinator 115 sends the data to the analytics executor #2 113 and proceeds back to 307.

Figures 4, 5:
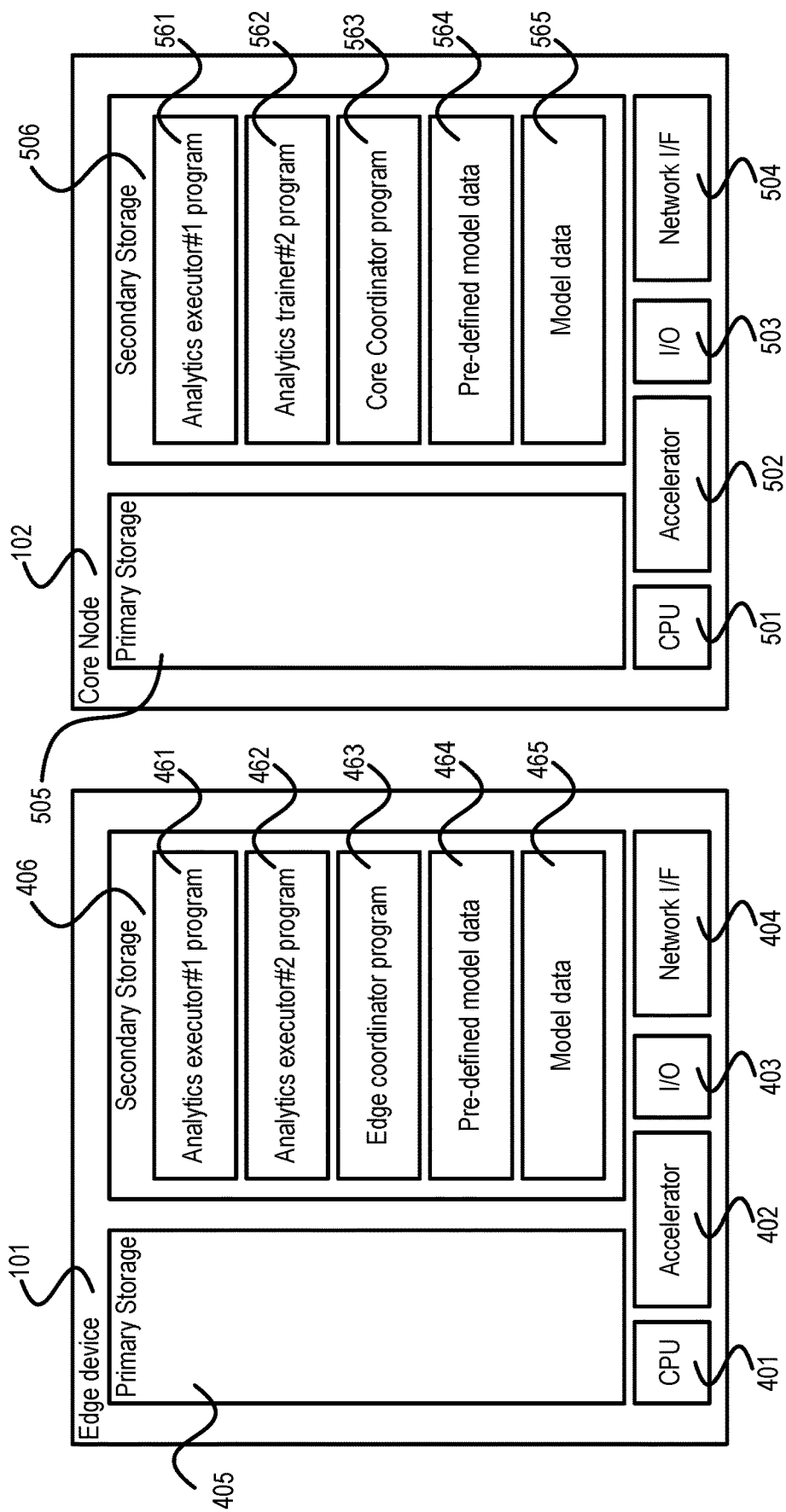
FIG. 4 illustrates a system diagram for the edge device, in accordance with an example implementation.
FIG. 5 illustrates a system diagram of the core device, in accordance with an example implementation.

FIG. 4 illustrates a system diagram for the edge device 101, in accordance with an example implementation. The edge device 101 involves a Central Processing Unit (CPU) 401, an accelerator 402, an Input/Output (I/O) module 403, a network interface (I/F) module 404, a primary storage 405 and a secondary storage 406. CPU 401 can be in the form of a hardware processor or a combination of hardware and software processors. Accelerator 402 involves special purpose hardware or special purpose/hardware and software to accelerate the performance of functions as described herein, and can be separate from, or in addition to, the CPU 401. I/O module 403 is configured to provide an interface to an operator, such as keyboard, mouse, and so on in accordance with the desired implementation. Network I/F module 404 is configured to facilitate data transmissions across a network and communications to and from the core device 102. The secondary storage 406 is a persistent storage and includes an analytics executor #1 program 461, an analytics executor #2 program 462, an edge coordinator program 463, pre-defined model data 464 and model data 465.

The analytics executor #1 program 461 is loaded into the primary storage 405 and runs as the analytics executor #1 111 by CPU 401. Depending on the desired implementation, the analytics executor #1 111 can also be run by the accelerator 402 at desired times. The analytics executor #2 program 462 is loaded into the primary storage 405 and runs as the analytics executor #1 113 by CPU 401. Depending on the desired implementation, the analytics executor #2 113 can also be run by the accelerator 402 at desired times. The edge coordinator program 463 is loaded into the primary storage 405 and runs as the edge coordinator 115 by CPU 401. The pre-defined model data 464 is loaded into the primary storage 405 and acts as the pre-defined model 112 by CPU 401. The model data 465 is loaded into the primary storage 405 and acts as the model 114 by CPU 401.

FIG. 5 illustrates a system diagram of the core device 102, in accordance with an example implementation. The core device 102 can involve of a CPU 501, an accelerator 502, an I/O module 503, a network I/F module 504, a primary storage 505 and a secondary storage 506 with similar functionality as described in FIG. 4. The secondary storage 506 is a persistent storage and includes an analytics executor #1 program 561, an analytics trainer #2 program 562, a core coordinator program 563, a pre-defined model data 564 and a model data 565.

The analytics executor #1 program 561 is loaded into the primary storage 505 and runs as the analytics executor #1 121 by CPU 501. Depending on the desired implementation, the analytics executor #1 121 can also be run by the accelerator 502 at the desired times. The analytics trainer #2 program 562 is loaded into the primary storage 505 and runs as the analytics trainer #2 123 by CPU 501. Depending on the desired implementation, the analytics trainer #2 123 can also be run by the accelerator 502 at the desired times.

The core coordinator program 563 is loaded into the primary storage 505 and runs as the core coordinator 125 by CPU 501. The pre-defined model data 564 is loaded into the primary storage 505 and acts as the pre-defined model 122 by CPU 501. The model data 565 is loaded into the primary storage 505 and acts as the model 124 by CPU 501.

Second Example Implementation

In a second example implementation, there is an automatic changing method of both the analytics algorithm and models for systems that are connected to a network.

Figure 6:
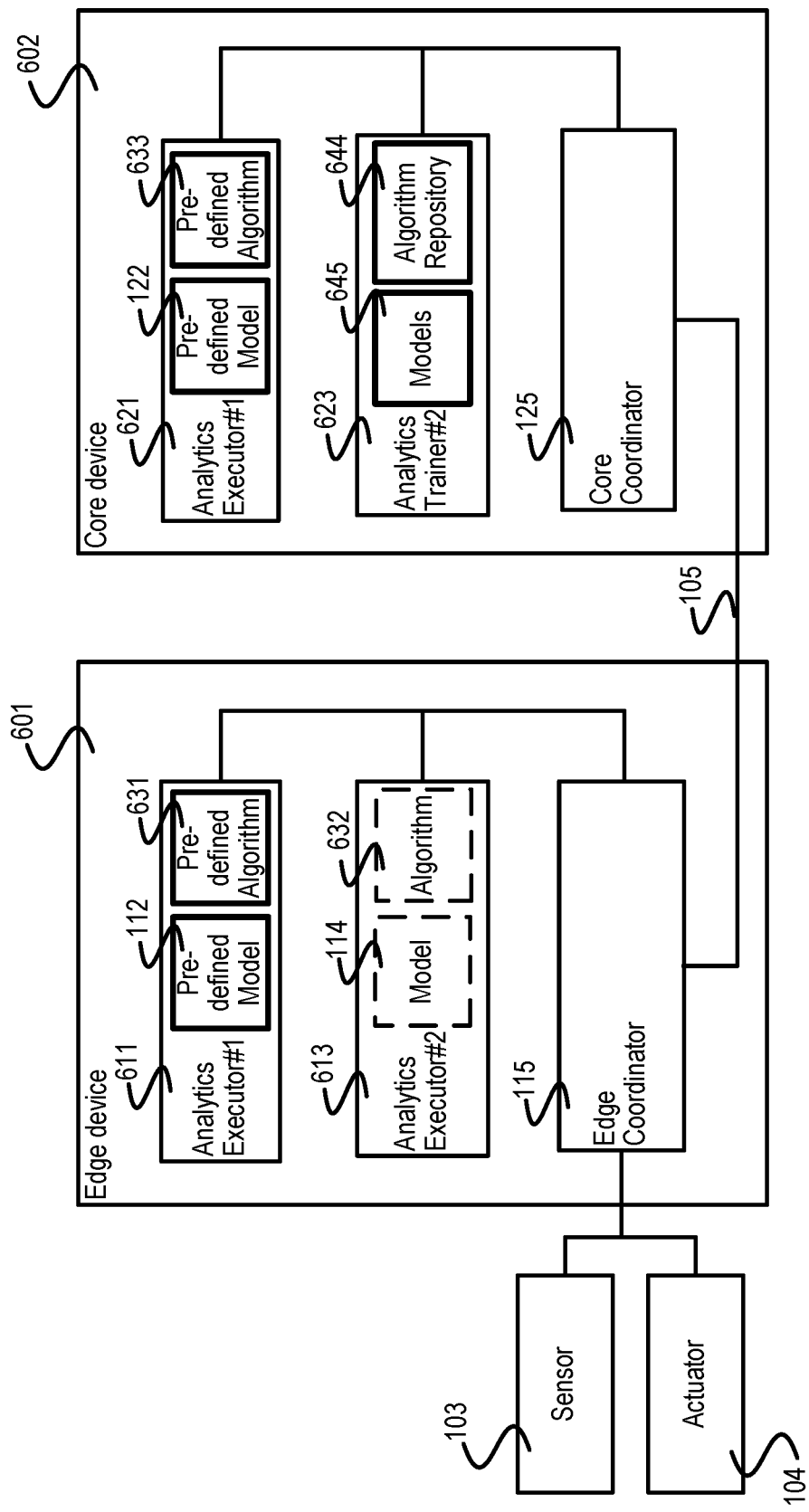
FIG. 6 illustrates the whole figure of the automatic algorithms and models changing system, in accordance with an example implementation.

FIG. 6 illustrates the whole figure of the automatic algorithms and models changing system, in accordance with an example implementation. In this example, the system involves at least one edge device 601 that is on the edge area such as the area inside a factory plant, and at least one core device 602 that is on the cloud.

The edge device 601 is connected to one or more sensors 103 and also connected to one or more actuators 104. One of the examples of sensors 103 is a video camera. The edge device 601 and the core device 602 are connected by a network 105. The edge device 601 involves an analytics executor #1 611, an analytics executor #2 613 and an edge coordinator 115. The analytics executor #1 611 has a pre-defined algorithm 631 and a pre-defined model 112 for analytics. The analytics executor #2 613 will further generate an algorithm 632 and a model 114 for analytics through automated steps as described herein.

The core devices 602 involve an analytics executor #1 621, an analytics executor #2 613 and an core coordinator 125. The analytics executor #1 621 has a pre-defined algorithm 633 and a pre-defined model 122 for analytics. The analytics trainer #2 623 has an algorithm repository 644 and models 645 for analytics.

In the example execution of the second example implementation, the analytics executor #1 611, the analytics executor #2 613 and the analytics executor #1 621 run in accordance with a given algorithm (e.g., the pre-defined algorithm 631, the algorithm 632 and the pre-defined algorithm 633), and also in accordance with a given analytics model (e.g., the pre-defined model 112, the model 114, and the pre-defined model 122). Analytics executor #1 611 and analytics executor #2 613 output both the accuracy of analytics and the analytics result.

In the example execution of the second example implementation, the analytics trainer #2 trains some models 645 in accordance with running all analytics algorithms simultaneously in the algorithm repository 644, and also outputs both the accuracy of the analytics and the analytics result.

Figure 7:
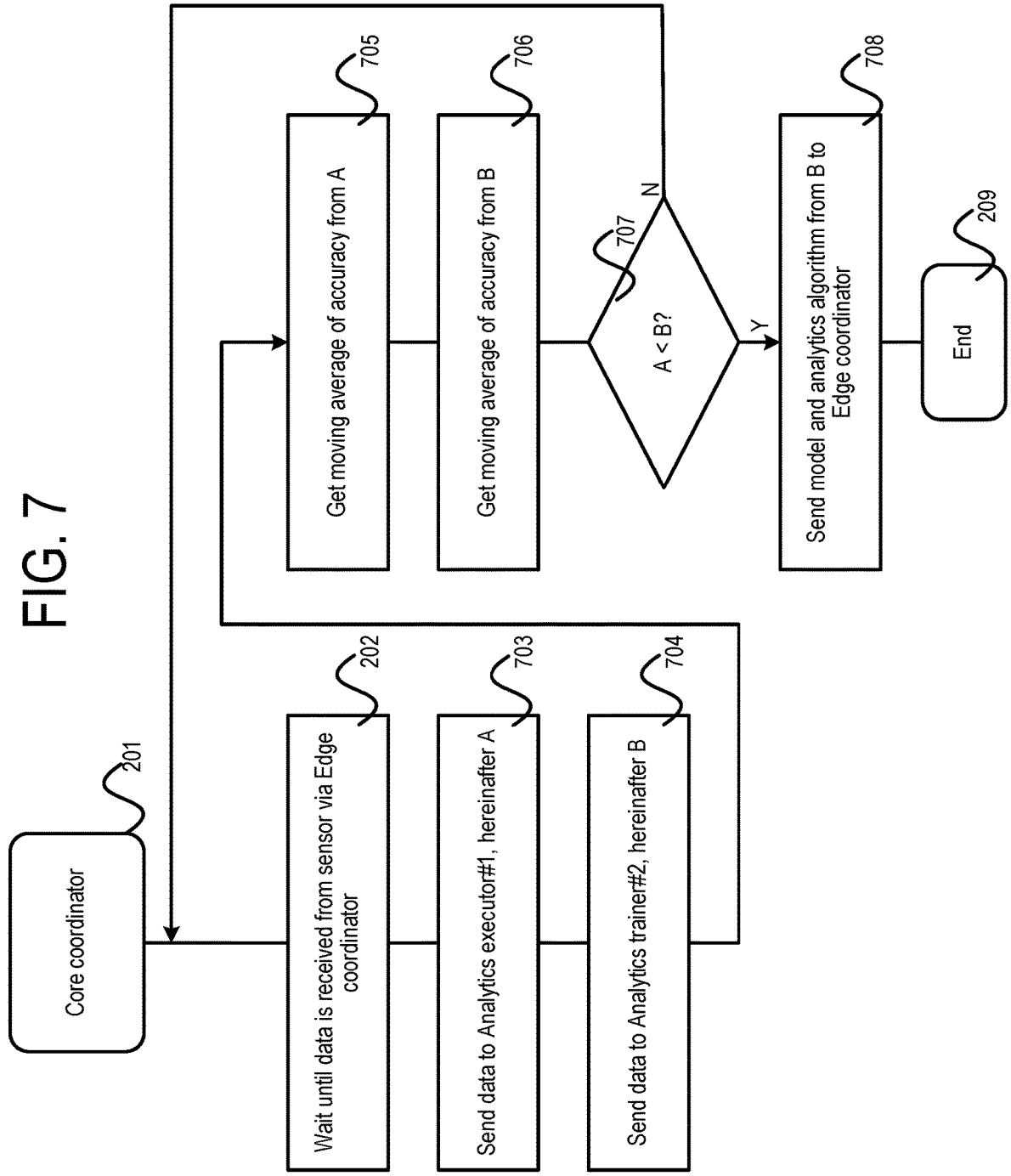
FIG. 7 illustrates an example flow chart of the core coordinator, in accordance with an example implementation.

In an example execution of the second example implementation, as illustrated in the flow of FIG. 7, the core coordinator 125 further compares all accuracies from all algorithms in the algorithm repository 644, selects one algorithm having the highest moving average with respect to the accuracy, and compares the average with the moving average of the accuracy of analytics from the analytics executor #1 121. If the chosen moving average of the accuracy of analytics from the analytics trainer #2 623 is greater than the moving average of the accuracy of analytics from the analytics executor #1 121, the core coordinator 125 sends both the chosen analytics and the model to the edge coordinator 115.

FIG. 7 illustrates an example flow chart of the core coordinator 125, in accordance with an example implementation. The flow for FIG. 7 is directed to the flow in which an algorithm repository is also involved as described with respect to FIG. 6. The flow is similar and compatible with the flow of FIG. 2, with some modifications as described herein.

After receiving the data, at 703, the core coordinator 125 sends the received data to the analytics executor #1 621. The analytics executor #1 621 analyzes the received data and outputs both the accuracy of the analytics and the analytics result from processing the data on to the model and analytics algorithm associated with the edge node. At 704, the core coordinator 125 sends the received data from 202 to the analytics trainer #2 623. The analytics trainer #2 623 analyzes the received data from 202 and outputs both the accuracy of analytics and the analytics result from processing the data on to all the models and all of the analytics algorithms in the repository.

At 705, the core coordinator 125 determines a moving average of the accuracy of analytics determined by the analytics executor #1 621. In the example execution for the first example implementation, a subset size is given by operators as a system configuration. The moving average is conducted for the output of the model and the analytics algorithm. The subset size is the same as a subset size of a moving average for the analytics trainer #2 623 at 706. At 706, the core coordinator 125 determines a moving average of the accuracy of analytics determined by the analytics trainer #2 623. The moving average is conducted for the output of the trained model as well as the associated analytics algorithm from the repository having the highest moving average accuracy. In the example execution for the second example implementation, a subset size is given by operators as a system configuration. The subset size is the same as the subset size of the moving average for the analytics executor #1 621 at 205.

At 707, the core coordinator 125 compares the moving average of the accuracy of analytics from the analytics executor #1 621 from 705, and the moving average of the accuracy of analytics from the analytics trainer #2 623 from 706. If the moving average of the accuracy of analytics from the analytics trainer #2 623 from 706 is greater than the moving average of the accuracy of analytics from the analytics executor #1 621 from 705 (Y), then the core coordinator 125 sends the model from the models 645 with the corresponding analytics algorithm of the algorithm repository 644 having the highest moving average accuracy, from the analytics trainer #2 623 to the edge coordinator 115 at 708 and the flow ends at 209. Otherwise (N) the flow proceeds back to 202.

Figure 8:
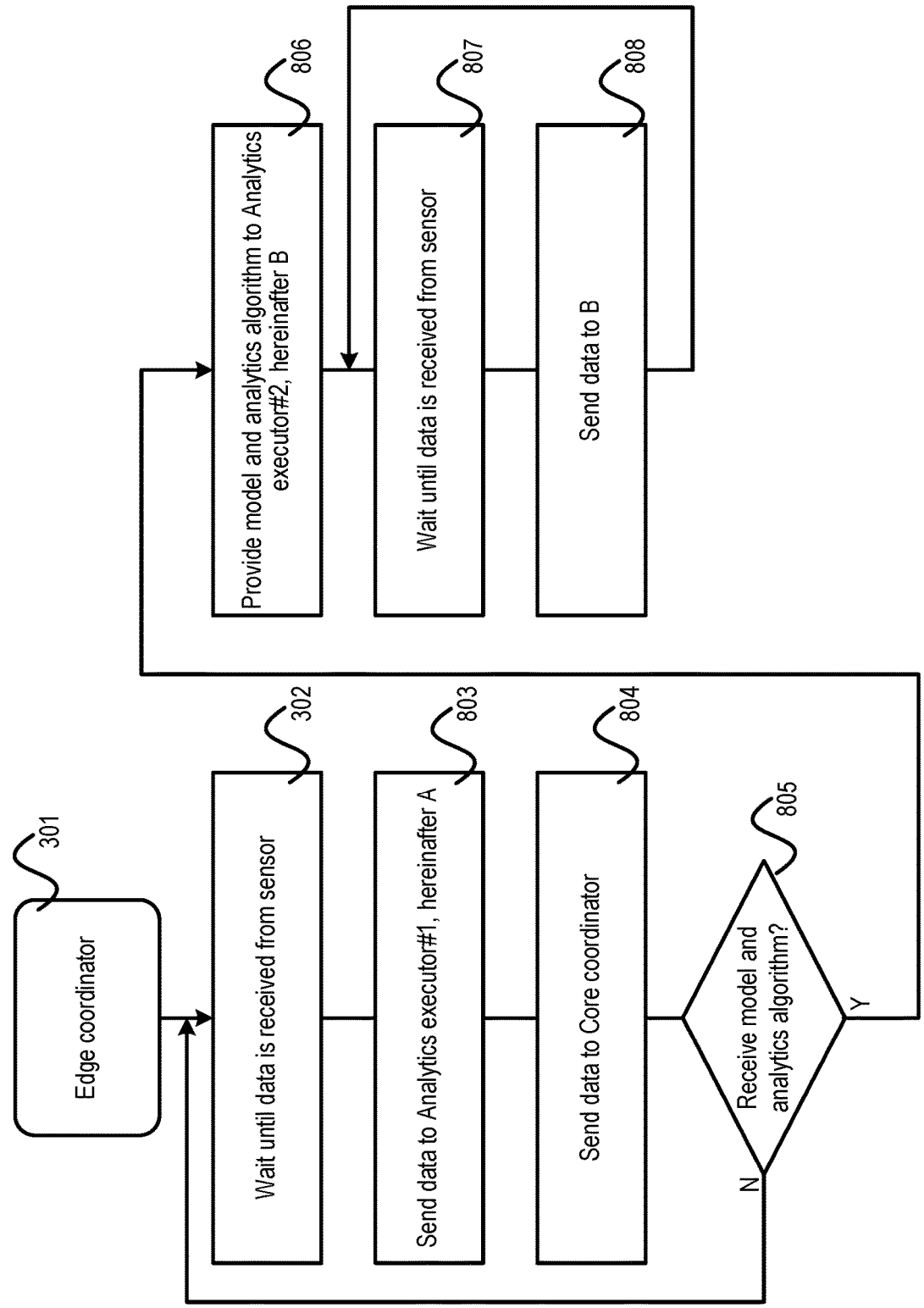
FIG. 8 illustrates a flow chart for the edge coordinator, in accordance with an example implementation.

FIG. 8 illustrates a flow chart for the edge coordinator 115, in accordance with an example implementation. Specifically, FIG. 8 illustrates the functionality of the edge node after the edge receives a model and its corresponding analytics algorithm as depicted in FIG. 6, and is similar in function to FIG. 3 with some differences as explained herein. After the edge coordinator 115 has started the flow at 301, the edge coordinator 115 waits until data is received from the sensor 103 at 302.

After receiving the data from the sensor 103, the edge coordinator 115 sends the received data to the analytics executor #1 at 803. At 804, the edge coordinator 115 sends the received data from 302 to the core coordinator 125. At 805, the edge coordinator 115 checks whether a model from the models 645 and an analytics algorithm from an algorithm repository 644 is received from the core coordinator 125. If so (Y), the flow proceeds to 806 wherein the edge coordinator 115 provides the model to the analytics executor #2 113 as the model #114 and provides the algorithm as algorithm 632. Otherwise (N) the flow proceeds back to 302.

At 807, the edge coordinator 115 waits until data is received from the sensor 103. After receiving the data at 808, the edge coordinator 115 sends the data to the analytics executor #2 113 and proceeds back to 807.

As described herein, example implementations involve systems and methods for managing a plurality of edge nodes, which can involve, for data received from an edge node from the plurality of edge nodes, processing the data using a first analytics model that is utilized by the edge node, processing the data using a second analytics model, the second analytics model trained through an analytics trainer; and for the second analytics model determined to have better accuracy than the first analytics model, updating the edge node with the second analytics model as illustrated in FIGS. 1 to 8. Through such example implementations, models that conduct computational expensive analytics or require computationally expensive resources for training the model (e.g., neural networks) can be conducted at the core side instead of the edge node, and the core side can remotely update the edge node with more accurate models as they become trained. Such example implementations can address problems with executing training of models on the edge node, which may have limited computational resources available to do so. The models on the edge node can be updated based on the incoming data without having to conduct the updates at the edge node.

An example implementation can also involve managing a plurality of analytics algorithms; executing the plurality of analytics algorithms on the data; determining a first one of the plurality of analytics algorithms having a highest accuracy among the plurality of analytics algorithms; and for the first one of the plurality of analytics algorithms having higher accuracy than a second one of the plurality of analytics algorithms that is executed in the edge node, updating the edge node with the one of the plurality of analytics as illustrated in FIGS. 2 and 6. As described herein, example implementations involve determining accuracy of the plurality of algorithms based on a moving average of an accuracy of the plurality of algorithms. As described therein determining accuracy of the first analytics model and the second analytics model can be based on a moving average of an accuracy of the first analytics model and the second analytics model. Through such implementations, the edge node models can be updated with models having higher accuracy than the ones being executed by the edge node as determined from the core server. Further, the edge node does not need to dedicate computational resources to determine new models that are more accurate than its current one.

Example implementations can also involve one or more accelerators utilized for processing the data using the first analytics model that is utilized by the edge node, and processing the data using the second analytics model; wherein the first analytics model and the second analytics model are neural networks configured to process video data; and wherein the data from the edge node is video data as described in FIGS. 1 and 6. As illustrated in FIGS. 1 and 6, the edge node is configured to control one or more video cameras and provide video from the video cameras as the data, wherein the edge node is disposed in a factory plant. Through such example implementations, models that are computationally intensive to train, such as neural networks, can be trained at the core side and then the edge node can be updated with new neural networks as needed, even if the edge node is disposed remotely in a factory plant.

Through example implementations described herein, device configuration and registration into the management system can be facilitated autonomously without the need for a human to physically access the edge device.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. An apparatus configured to manage a plurality of edge nodes, the apparatus comprising:
a processor, configured to:
for data received from an edge node from the plurality of edge nodes, process the data using a first analytics model that is utilized by the edge node,
process the data using a second analytics model, the second analytics model trained through an analytics trainer managed at the apparatus; and
for the second analytics model determined to have better accuracy than the first analytics model, update the edge node with the second analytics model;
wherein the apparatus further comprises a storage configured to store a plurality of analytics algorithms, wherein the processor is further configured to:
execute the plurality of analytics algorithms on the data;
determine a first one of the plurality of analytics algorithms having a highest accuracy among the plurality of analytics algorithms; and
for the first one of the plurality of analytics algorithms having higher accuracy than a second one of the plurality of analytics algorithms that is executed in the edge node, update the edge node with the one of the plurality of analytics algorithms.

2. The apparatus of claim 1, wherein the processor is further configured to determine accuracy of the plurality of analytics algorithms based on a moving average of an accuracy of the plurality of analytics algorithms.

3. The apparatus of claim 1, wherein the processor is further configured to determine accuracy of the first analytics model and the second analytics model based on a moving average of an accuracy of the first analytics model and the second analytics model.

4. The apparatus of claim 1, further comprising one or more accelerators configured to process the data using the first analytics model that is utilized by the edge node, and process the data using the second analytics model;
wherein the first analytics model and the second analytics model are neural networks configured to process video data; and
wherein the data from the edge node is video data.

5. The apparatus of claim 1, wherein the edge node is configured to control one or more video cameras and provide video from the video cameras as the data, wherein the edge node is disposed in a factory plant connected to the apparatus by a network.

6. A method for managing a plurality of edge nodes, comprising:
for data received from an edge node from the plurality of edge nodes, processing the data using a first analytics model that is utilized by the edge node,
processing the data using a second analytics model, the second analytics model trained through an analytics trainer; and
for the second analytics model determined to have better accuracy than the first analytics model, updating the edge node with the second analytics model;
managing a plurality of analytics algorithms;
executing the plurality of analytics algorithms on the data;
determining a first one of the plurality of analytics algorithms having a highest accuracy among the plurality of analytics algorithms; and
for the first one of the plurality of analytics algorithms having higher accuracy than a second one of the plurality of analytics algorithms that is executed in the edge node, updating the edge node with the one of the plurality of analytics algorithms.

7. The method of claim 6, further comprising determining accuracy of the plurality of analytics algorithms based on a moving average of an accuracy of the plurality of analytics algorithms.

8. The method of claim 6, further comprising determining accuracy of the first analytics model and the second analytics model based on a moving average of an accuracy of the first analytics model and the second analytics model.

9. The method of claim 6, wherein one or more accelerators are utilized for processing the data using the first analytics model that is utilized by the edge node, and processing the data using the second analytics model;
wherein the first analytics model and the second analytics model are neural networks configured to process video data; and
wherein the data from the edge node is video data.

10. The method of claim 6, wherein the edge node is configured to control one or more video cameras and provide video from the video cameras as the data, wherein the edge node is disposed in a factory plant.

11. A system, comprising:
a plurality of edge nodes; and
an apparatus comprising:
a processor, configured to:
for data received from an edge node from the plurality of edge nodes, process the data using a first analytics model that is utilized by the edge node,
process the data using a second analytics model, the second analytics model trained through an analytics trainer managed at the apparatus; and
for the second analytics model determined to have better accuracy than the first analytics model, update the edge node with the second analytics model;
wherein the apparatus further comprises a storage configured to store a plurality of analytics algorithms, wherein the processor is further configured to:
execute the plurality of analytics algorithms on the data;
determine a first one of the plurality of analytics algorithms having a highest accuracy among the plurality of analytics algorithms; and
for the first one of the plurality of analytics algorithms having higher accuracy than a second one of the plurality of analytics algorithms that is executed in the edge node, update the edge node with the one of the plurality of analytics algorithms.

12. The system of claim 11, wherein the processor is further configured to determine accuracy of the plurality of analytics algorithms based on a moving average of an accuracy of the plurality of analytics algorithms.

13. The system of claim 11, wherein the processor is further configured to determine accuracy of the first analytics model and the second analytics model based on a moving average of an accuracy of the first analytics model and the second analytics model.

14. The system of claim 11, wherein the apparatus further comprises one or more accelerators configured to process the data using the first analytics model that is utilized by the edge node, and process the data using the second analytics model;
wherein the first analytics model and the second analytics model are neural networks configured to process video data; and
wherein the data from the edge node is video data.

15. The system of claim 11, wherein the edge node is configured to control one or more video cameras and provide video from the video cameras as the data, wherein the edge node is disposed in a factory plant connected to the apparatus by a network.

* * * * *